US 6,668,783 B2

(12) United States Patent
Taylor (10) Patent No.: US 6,668,783 B2
(45) Date of Patent: Dec. 30, 2003

(54) CYLINDER HEAD FOR INTERNAL COMBUSTION ENGINE (76) Inventor: G. Brandt Taylor, 36 Barnes Hill Rd., Berlin, MA (US) 01503

( * ) Notice: Subject to any disclaimer, the term of this patent is extended or adjusted under 35 U.S.C. 154(b) by 0 days.

(21) Appl. No.: 10/153,212

(22) Filed: May 21, 2002

(65) Prior Publication Data

US 2003/0177997 A1 Sep. 25, 2003

Related U.S. Application Data (63) Continuation of application No. 10/103,429, filed on Mar. 21, 2002, and a continuation of application No. 09/765,736, filed on Jan. 22, 2001.
(60) Provisional application No. 60/177,771, filed on Jan. 24, 2000.

(51) Int. Cl.[7] .............................................. F02M 35/10
(52) U.S. Cl. ................................................... 123/193.5
(58) Field of Search .......................... 123/193.5, 193.3, 123/184.21, 308

(56) References Cited

U.S. PATENT DOCUMENTS

| 1,613,995 A | 1/1927 | Growe |
| 2,640,470 A | 6/1953 | Haltenberger |
| 2,920,613 A | 1/1960 | Vogel et al. |
| 2,920,648 A | 1/1960 | Sheffer |
| 2,946,345 A | 7/1960 | Weltmer |
| 3,008,453 A | 11/1961 | Kahn et al. |
| 3,408,992 A | 11/1968 | Von Seegern et al. |
| 3,875,918 A | 4/1975 | Loynd |
| 4,066,720 A | 1/1978 | Carter |
| 4,196,703 A * | 4/1980 | Okitsu et al. ............... 123/308 |
| 4,210,107 A | 7/1980 | Shaffer |
| 4,308,829 A | 1/1982 | Yamada et al. |
| 4,308,830 A | 1/1982 | Yamada et al. |
| 4,318,372 A | 3/1982 | Bracken, Jr. et al. |
| 4,413,598 A | 11/1983 | Tsutsumi |
| 4,415,507 A | 11/1983 | Voliva |
| 4,424,777 A | 1/1984 | Klomp |
| 4,492,212 A | 1/1985 | Dooley |
| 4,567,860 A * | 2/1986 | Sugiyama ................ 123/193.5 |
| 5,816,210 A * | 10/1998 | Yamaguchi ............... 123/193.5 |
| 6,006,721 A | 12/1999 | Shannon et al. |
| 6,014,987 A | 1/2000 | List et al. |
| 6,039,029 A | 3/2000 | Nagasaka et al. |
| 6,371,068 B2 * | 4/2002 | Taylor .................. 123/184.21 |

* cited by examiner

Primary Examiner—Marguerite McMahon
(74) Attorney, Agent, or Firm—Blodgett & Blodgett, P.C.

(57) ABSTRACT

A modified cylinder head for an internal combustion engine. The cylinder head includes an air inlet cavity that is divided into two channels.

8 Claims, 7 Drawing Sheets

CYLINDER HEAD FOR INTERNAL COMBUSTION ENGINE

CROSS-REFERENCE TO RELATED APPLICATIONS

This application claims the benefit under 35 U.S.C. §119 (e) of prior U.S. Provisional Application No. 60/177,771 filed Jan. 24, 2000; and is a continuation of U.S. application Ser. No. 09/765,736 filed Jan. 22, 2001; and is a continuation of U.S. application Ser. No. 10/103,429 filed Mar. 21, 2002; all of which is hereby incorporated by reference.

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is directed to the air intake features of an internal combustion engine. For most internal combustion engines, ambient air is mixed with a vaporized fuel. The air fuel mixture is introduced into the working cylinder portion of the engine. Power can be increased by increasing air flow into the cylinder. One way to increase air flow to an internal combustion engine is to add a "velocity stack" or "air horn" to a carburetor or fuel injector. A "velocity stack" is a generally cone-shaped device that is open to the outside and directs airflow to the air-fuel system. These devices are more commonly used on engines that are intended for extra power including automobile, motorcycle or power boat engines. The velocity stack has a relatively large inlet opening and a relatively small outlet opening. Generally, when a velocity stack is used on an engine, an air filter is not used.

Many engine designs include an adjustable vane in the air horn, air intake port of the cylinder head or both. The vane functions as a valve to control the air flow to accommodate variations in power needs. In one known engine design, the vane in the air intake passageway of the cylinder head is fixed within the passageway. The vane gradually twists so that the cross-section area of the air intake passageway gradually narrows toward the inlet port of the cylinder. Therefore, the primary effect of the vane is to direct the air flow.

Many of the prior art air intake devices that employ vanes restrict air flow in the intake port in such a way that the air flow is biased toward one side of the valve opening and it's velocity is maintained. In each case, a circular air flow is created within the combustion cylinder around the cylinder axis. This increases mixing of the charge in the cylinder for best fuel efficiency. Therefore, the prior art air intake devices which employ a vane increase air turbulence to increase fuel efficiency not power. These and other difficulties experienced with the prior art air horn and cylinder head designs have been obviated by the present invention.

A principle object of the present invention is to provide an air intake system for an internal combustion engine that will produce an increased air flow to the engine and a resulting increase in horsepower.

A further object of the invention is the provision of an air intake system for an internal combustion engine that includes a modification in the path of the air flow leading to the engine.

Another object of the invention is the provision of a vane structure in either the air passageway of the air horn or cylinder head for reducing turbulence and increasing air flow to the cylinder.

Still another object of the present invention is to provide a modified cylinder head to produce an increased air flow into the cylinder for a resulting increase in horse power.

BRIEF SUMMARY OF THE INVENTION

In general, the invention consists of a modified air intake for an internal combustion engine. The air intake mechanism includes a divided air intake passageway in the cylinder head.

BRIEF DESCRIPTION OF THE DRAWINGS

The character of the invention, however, may be best understood by reference to the accompanying drawings, in which.

DETAILED DESCRIPTION OF THE INVENTION

Figure 1:
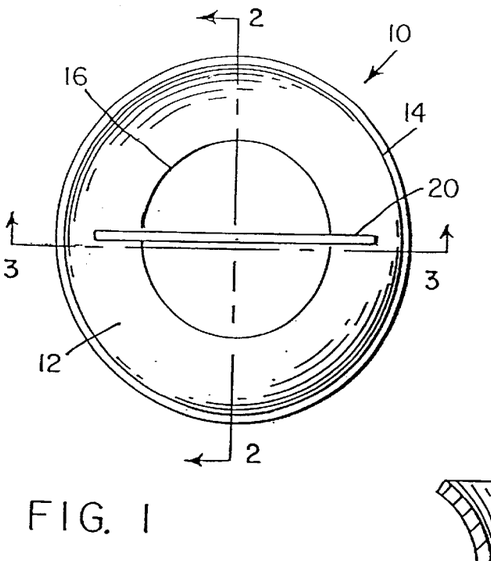
FIG. 1 is a top plan view of an air horn which forms part of the air intake of a motorcycle engine and embodying the principles of the present invention.
Figure 2:
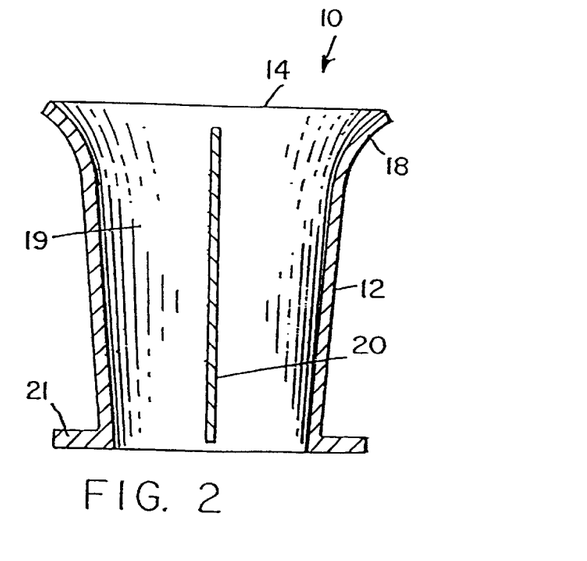
FIG. 2 is a vertical cross-sectional view taken along line II—II of FIG. 1 and looking in the direction of the arrows.
Figure 3:
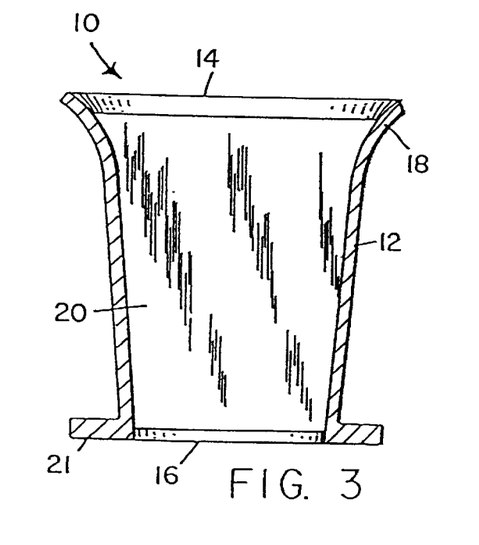
FIG. 3 is a vertical cross-sectional view taken along line III—III of FIG. 1 and looking in the direction of the arrows.

Referring to FIGS. 1–3, there is shown an "air horn" or "velocity stack", generally indicated by the reference numeral 10, for use on some types of engines. Air horn 10 has a frusto conical wall 12 that has an inlet opening 14 at one end of the air horn and an outlet opening 16 at the opposite end of the air horn. Wall 12 of the air horn flares outwardly as at 18 at the inlet opening 14. The wall 12 defines an internal air passageway 19 that extends from the inlet opening 14 to the outlet opening 16. A mounting flange 21 is located adjacent the outlet opening 16. A vane 20 is located in the passageway 19 and is located in a plane that is parallel to the air flow path. The vane 20 spans the passageway 19 in a lateral direction and extends nearly the entire length of the passageway 19 in the longitudinal direction. Air horn 10 is located on the outside of the motorcycle and is operatively connected to the carburetor of the motorcycle. Under circumstances other than for an internal combustion engine, the presence of a vane in an air passageway would be detrimental to air flow. The vane reduces the cross-sectional area of the passageway and creates a drag to air flow. This is confirmed by bench tests which show that air flow through the air horn is reduced when a vane is added to the chamber of the air horn. However, tests also showed that when the air horn is operatively connected to an internal combustion engine, air flow and horsepower are both increased. It is believed that an internal combustion engine causes a vortex to develop in the air inlet passageways leading from the outside to the cylinders of the engine. It is also believed that the presence of the vane within the air horn prevents a vortex from forming in the passageway of the air horn. Although the vane also impedes air flow, the disruption of, or prevention of a vortex results in a net gain in air flow to the engine. Best results for increased air flow and the resulting increase in horsepower have been achieved by having the vane extend substantially along the entire length of the air horn. Substantial beneficial results have also been obtained with a vane having a length which is at least equal to the smallest diameter of the air horn.

Figure 4:
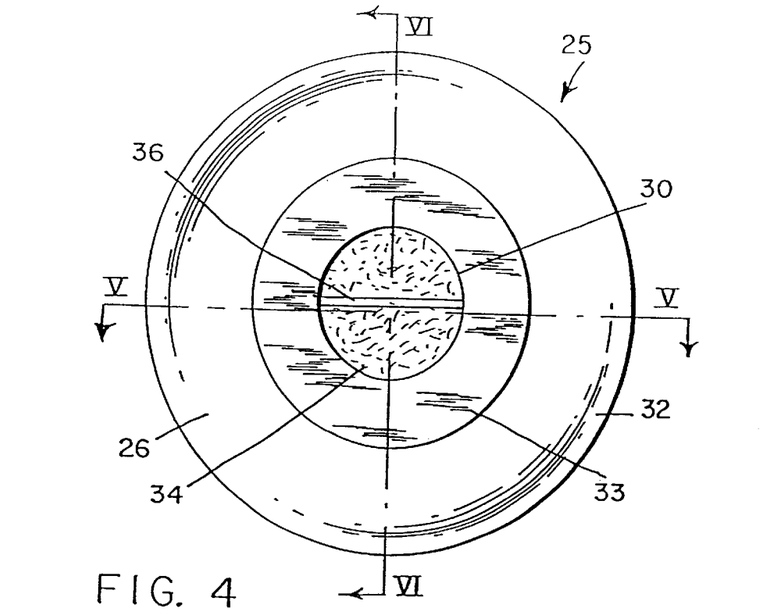
FIG. 4 is a bottom plan view of a modified velocity stack for an internal combustion engine and embodying the principles of the present invention.
Figure 5:
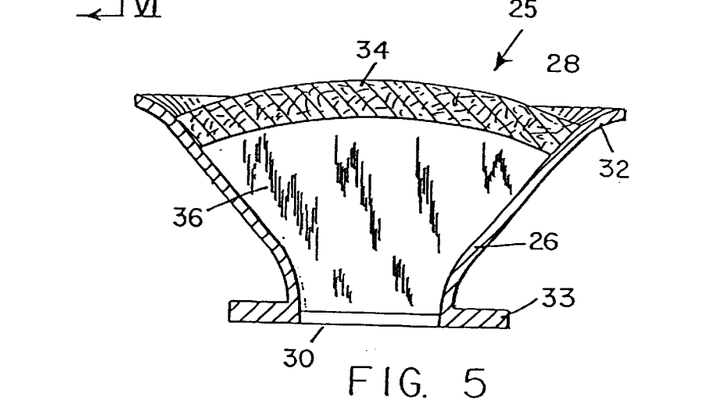
FIG. 5 is a vertical cross-sectional view taken along line 5—5 of FIG. 4 and looking in the direction of the arrows.
Figure 6:
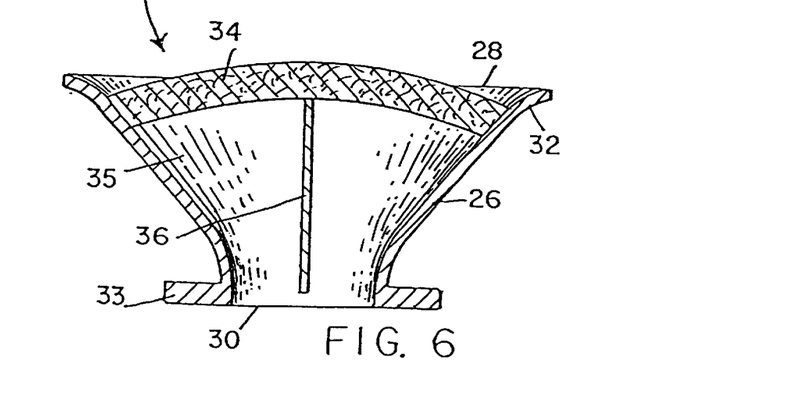
FIG. 6 is a vertical cross-sectional view taken along line 6—6 of FIG. 4 and looking in the direction of the arrows.

Referring to FIGS. 4–6, there is shown a second type of air horn of a type commonly used on motorcycles and has been modified in accordance to the present invention. The air horn shown in FIGS. 4–6 is generally indicated by the reference numeral 25 and has a frusto conical side wall 26 that extends from an inlet opening 28 to an outlet opening 30. The wall 26 flares outwardly at 32 at the inlet opening 28. A mounting flange 33 is located adjacent the outlet opening 30. An air filter 34 is located at the inlet opening 28. A vane 36 is located in the passageway 35. A side wall 26 defines a passageway 35. The vane 36 extends transversely across the entire width of the passageway 35 as shown in FIG. 5 and extends longitudinally from the filter 34 to the outlet opening 30. It is preferred that the vane 36 extends substantially the entire length of the air horn 25. However, a substantial increase in air flow and a resulting increase in horsepower are obtained from a longitudinal vane length which is at least equal to the smallest diameter of the air horn, i.e. diameter of the outlet opening 30.

Figure 7:
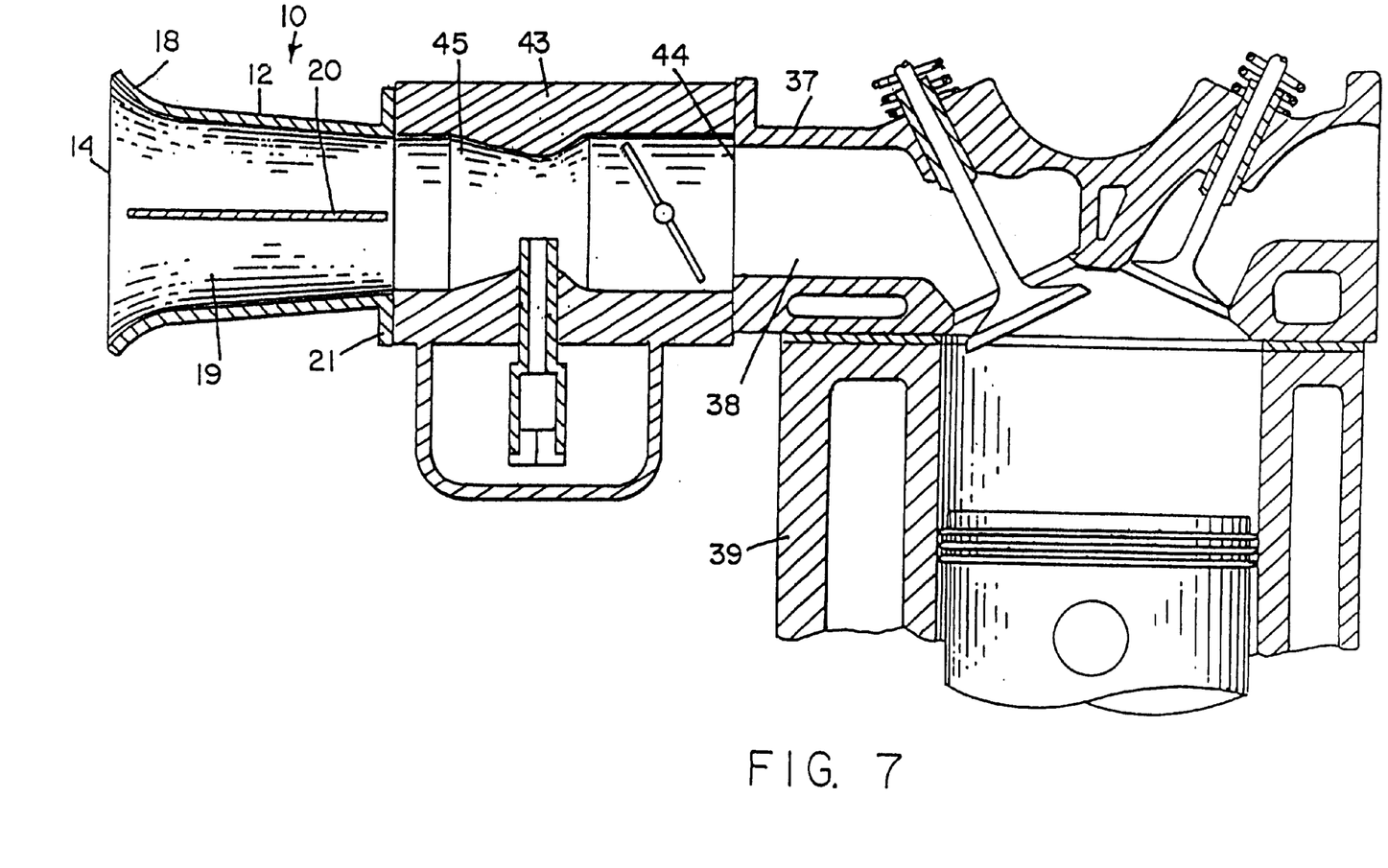
FIG. 7 is a cross-sectional view of the cylinder head of an internal combustion engine equipped with an air horn of the present invention.

FIG. 7 shows the air horn 10 of the present invention applied to the cylinder head of an internal combustion engine. The cylinder head is indicated by the reference numeral 37 and includes an air intake passageway 38. The cylinder head 37 is shown affixed to the combustion end of a cylinder 39. A carburetor 43 is located between the air horn 10 and the cylinder head 27. The carburetor 43 includes a passageway 45 which connects the passageway 19 of the air horn 10 to the air intake port 38.

Figure 8:
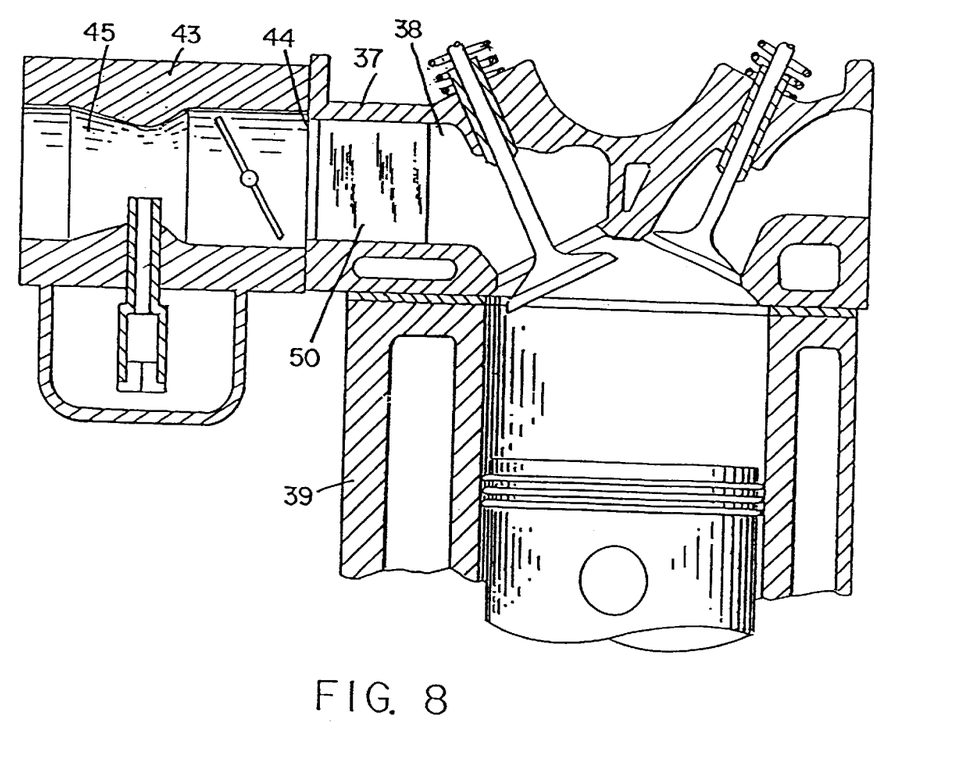
FIG. 8 is a cross-sectional view similar to FIG. 7 without an air horn and having a vane in the air intake passageway of the cylinder head.

Referring to FIG. 8, there is shown a modification of the invention wherein the air horn is not utilized. A vane 50 similar to vane 20 of the air horn is located within the air intake passageway 38. The vane 20 spans the entire width of the air intake passageway 38 and extends longitudinally from the opening 44 of the air intake passageway 38. The longitudinal length of the vane 50, is at least equal to the diameter of the inlet opening 44. Tests have shown that the inclusion of a vane in the passageway 38, such as that shown in FIG. 8 or passageway 19 of the air horn as shown in FIG. 7, results in increased air flow to the cylinder of the internal combustion engine, with a resulting increase in horsepower for a wide range of rpm of the engine. Test results appear to indicate that, without a vane, a vortex is created in the air flow to the internal combustion engine. Test results also appear to show that the presence of a vane in the path of the air flow between the cylinder of the engine and the opening to ambient air eliminates or disrupts the vortex sufficiently to increase the air flow to the engine with a resulting increase in horsepower.

Figure 9:
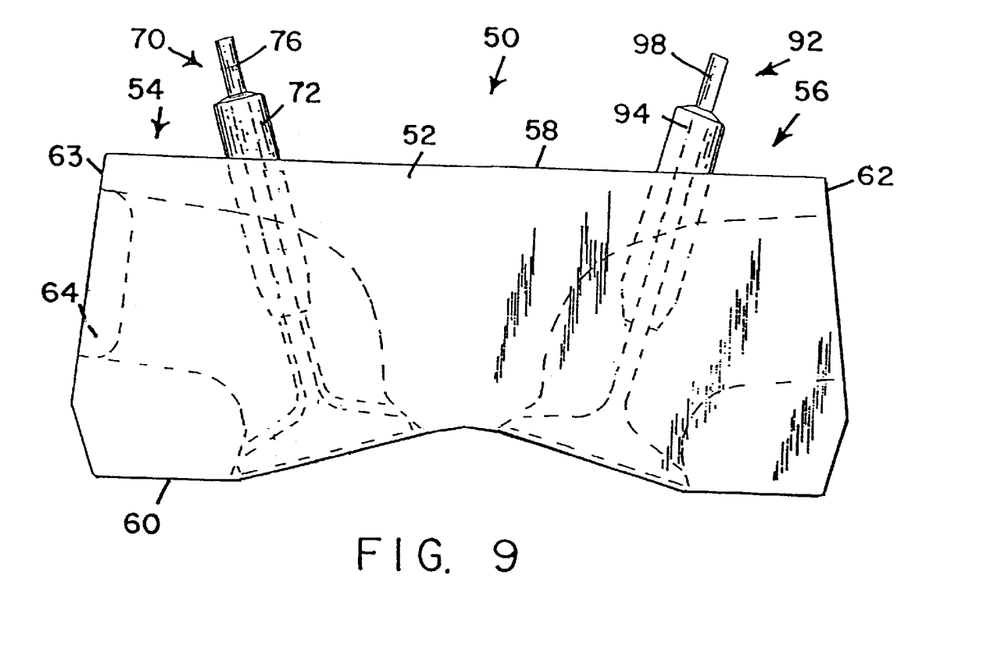
FIG. 9 is a front elevational view of a cylinder head for an internal combustion engine and embodying the principles of the present invention.
Figure 10:
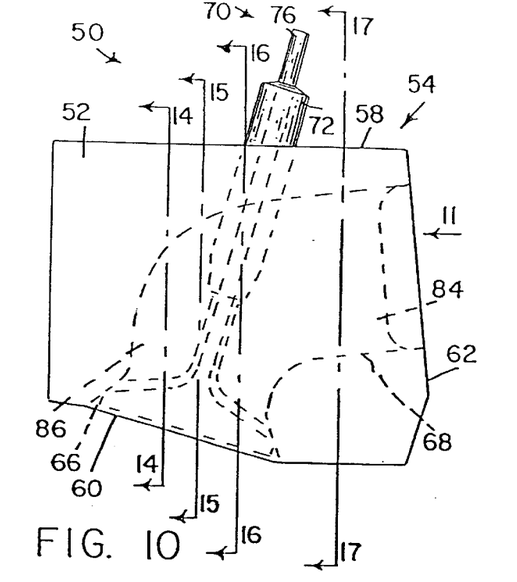
FIG. 10 is a rear elevational view of the air intake portion of the cylinder head of FIG. 9.
Figure 11:
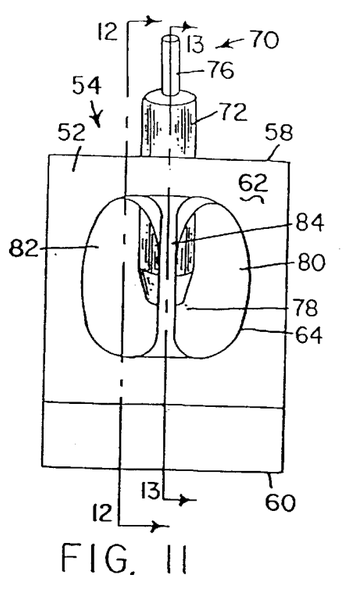
FIG. 11 is a side elevational view looking in the direction of arrow 11 of FIG. 10.
Figures 12, 13:
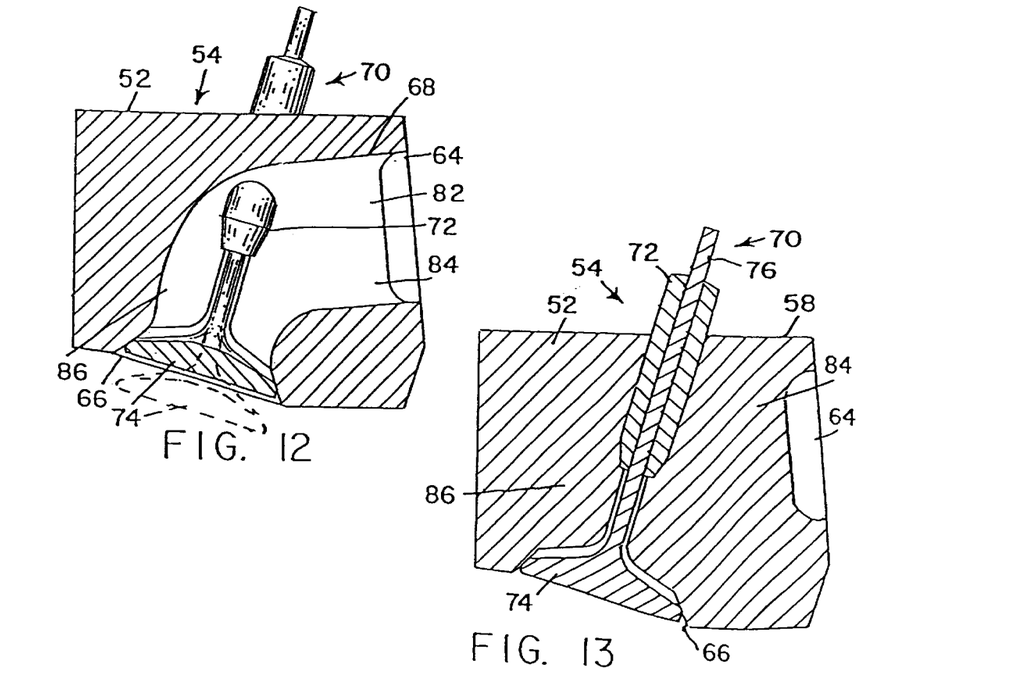
FIG. 12 is a vertical cross-sectional view taken along line 12—12 of FIG. 11 looking in the direction of the arrows.
FIG. 13 is a vertical cross-sectional view taken along line 13—13 of FIG. 11 and looking in the direction of the arrows.
Figure 14:
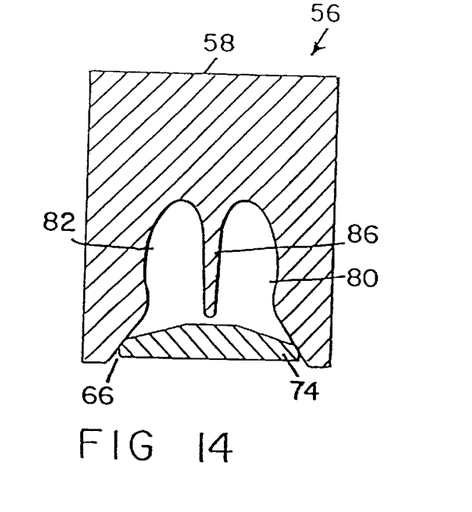
FIG. 14 is a vertical cross-sectional view taken along 14—14 of FIG. 10 and looking in the direction of the arrows.
Figure 15:
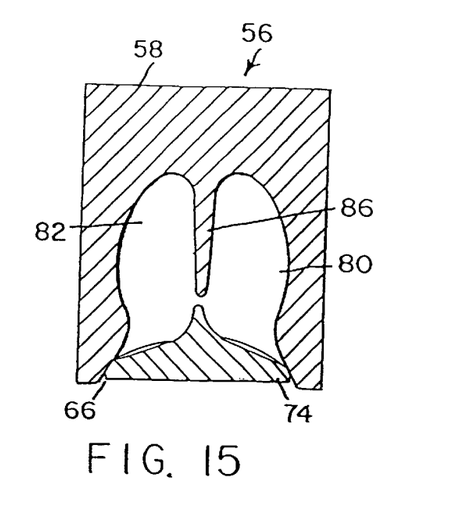
FIG. 15 is a vertical cross-section view taken along line 15—15 of FIG. 10 and looking in the direction of the arrows.
Figure 16:
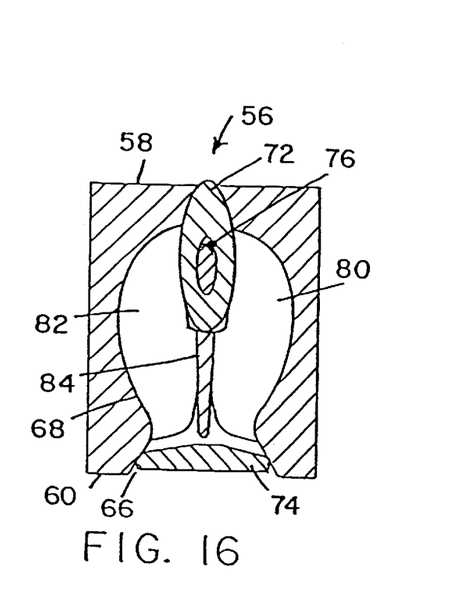
FIG. 16 is a vertical cross-sectional view taken along line 16—16 of FIG. 10 and looking in the direction of the arrows.
Figure 17:
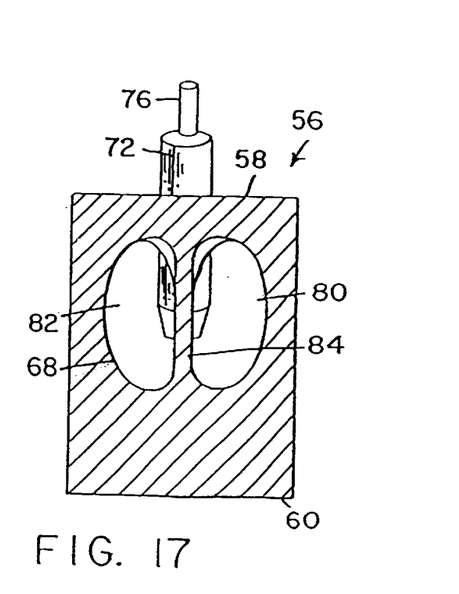
FIG. 17 is a vertical cross-sectional view taken along line 17—17 of FIG. 10 and looking in the direction of the arrows.

Referring to FIG. 9, there is shown a modified cylinder head for an internal combustion engine. The modified cylinder head is generally indicated by the reference numeral 50 and includes a housing 52 having an air inlet half, generally indicated by the reference numeral 54, and an exhaust gas half portion, generally indicated by the reference numeral 56. The housing 52 has a top surface 58, a bottom surface 60, a side surface 62 and a side surface 63.

Referring specifically to FIGS. 10–17, the air inlet half has an air inlet opening 64 in the side surface 62, an air outlet opening in the bottom surface 60 and an air inlet cavity 68 extending from the air inlet opening 64 to the air outlet opening 66. A poppet valve, generally indicated by the reference numeral 70, is located in the cavity 68. Poppet valve 68 includes a sleeve 72 fixed to the housing 52 and extending into the cavity 68. Poppet valve 68 also includes a head portion 74 at the air inlet opening 66 and a stem portion 76 slidably mounted in the sleeve 72 for movement between an open position in which the head portion 74 below the air outlet opening 66, shown in dotted lines in FIG. 12 to a closed position, in which the head portion 74 closes the opening 66, shown in full lines in FIG. 12.

The air inlet cavity 68 is divided into a first channel 80 and a second channel 82 by a dividing wall, generally indicated by the reference numeral 78. Dividing wall 78 includes an outer segment 84 and an inner segment 86. The outer segment 84 extends from air inlet opening 64 to the poppet valve 70. The inner segment 86 is located at the inner side of the poppet valve 70. The dividing wall 78 spans the entire cavity 68. There is sufficient clearance between the stem portion 76 and each of the segments 84 and 86 to enable the stem 76 to reciprocate axially. There is also a clearance between each of the segments 84 and 86 and the head portion 74 when the head portion is in its closed position. This clearance is exaggerated in the drawings.

In the past, the design of engine ports has been a compromise between larger ports that cause an engine to develop power at a higher engine speed and small ports that develop power at a lower engine speed. Tests have shown that for a given cross-sectional area of the channels 80 and 82 of the air inlet portion 54, there is a 5% to 10% increase in power. Significantly, the increase in power, when using segment 84, occurs across the entire RPM spectrum, with no area of decreased power.

The invention is also applicable to the internal combustion engines that have two intake valves and two exhaust valves for each cylinder.

What is claimed is:

1. A cylinder head for an internal combustion engine, said cylinder head comprising:

(a) a housing having a top surface, a bottom surface, a first side surface, an air inlet opening at said first side surface, an air outlet opening at said bottom surface of said housing, and an air inlet cavity extending from said air inlet opening to said air outlet opening;

(b) a dividing wall extending from said air inlet opening to a terminal end at said air outlet opening, said dividing wall dividing said air inlet cavity into a first channel and a second channel;

(c) a poppet valve having a head portion at said air outlet opening and a stem portion that extends from said head portion through said dividing wall, said stem portion being located in the same plane as said dividing wall and being slidably mounted in said dividing wall and said housing, said poppet valve being movable between an open position in which said head portion is below said air outlet opening and a closed position in which said head portion is below the terminal end of said dividing wall and in a closing relationship with said air outlet opening.

2. The cylinder head as recited in claim 1, wherein said dividing wall comprises:

(a) an outer segment extending from said air inlet opening to said poppet valve; and (b) an inner segment extending from said poppet valve to said air outlet opening.

3. The cylinder head as recited in claim 2, further comprising a sleeve mounted in said housing and extending into said air inlet cavity, said stem portion being slidable within said sleeve and each of said outer segments and said inner segment abutting said sleeve.

4. The cylinder head as recited in claim 2, wherein said outer segment spans said air inlet cavity.

5. A cylinder head for an internal combustion engine, said cylinder head comprising:

(a) a housing having a top surface, a bottom surface and a first side surface, an air outlet opening at said bottom side, a first air inlet opening at said side surface, a second air inlet opening at said side surface, a first air inlet channel extending from said first air inlet opening to said air outlet opening and a second air inlet channel extending from said second air inlet opening to said air outlet opening;

(b) a poppet valve having a head portion at said air outlet opening and a stem portion that extends between said first air channel and said second air channel and being mounted for axial movement in said housing between an open position in which said head portion is below and spaced from said air outlet opening and a closed position in which said head portion is at said air outlet opening for closing said air outlet opening.

6. The cylinder head as recited in claim 5, wherein each of said first and second air inlet channels has a terminal end at said air outlet opening that is located above the head portion of said poppet valve when said poppet valve is in the closed position.

7. The cylinder head as recited in claim 6, wherein there is a clearance space between said head portion and the terminal ends of said first and second air inlet channels when said poppet valve is in the closed position.

8. A cylinder head for an internal combustion engine, said cylinder head comprising:

(a) a housing having a top surface, a bottom surface, a first side surface, an air inlet opening at said first side surface, an air outlet opening at said bottom surface of said housing, and an air inlet cavity extending from said air inlet opening to said outlet opening;

(b) a poppet valve having a head portion at said air outlet opening and a stem portion that extends from said head portion through said air inlet cavity and said top surface, said stem portion being mounted in said head for movement between an open position in which said head portion is below said air outlet opening and a closed position in which said air outlet opening is closed by said head portion;

(c) a dividing wall extending from said air inlet opening to said poppet valve for dividing said air inlet cavity into a first channel that has a first exit opening at a first side of said poppet valve and a second channel that has a second exit opening at a second side of said poppet valve opposite said first side; and (d) a sleeve mounted in said housing and extending into said air inlet cavity, said stem portion being slidably mounted within said sleeve, said dividing wall abutting said sleeve and extending to said stem portion and to said head portion when said poppet valve is in the closed position.

\* \* \* \* \*